(12) United States Patent
Sinclair

(10) Patent No.: US 8,194,877 B2
(45) Date of Patent: Jun. 5, 2012

(54) AUDIO PROCESSING APPARATUS

(75) Inventor: Colin A. Sinclair, Angus (GB)

(73) Assignee: NCR Corporation, Duluth, GA (US)

( * ) Notice: Subject to any disclaimer, the term of this patent is extended or adjusted under 35 U.S.C. 154(b) by 1154 days.

(21) Appl. No.: 12/069,336

(22) Filed: Feb. 8, 2008

(65) Prior Publication Data

US 2009/0202086 A1 Aug. 13, 2009

(51) Int. Cl.
H04B 3/00 (2006.01)
(52) U.S. Cl. ......................................................... 381/77
(58) Field of Classification Search ...................... 381/77
See application file for complete search history.

(56) References Cited

U.S. PATENT DOCUMENTS

| | | | | |
|---|---|---|---|---|
| 6,314,330 | B1* | 11/2001 | Matthews | 700/94 |
| 6,628,999 | B1* | 9/2003 | Klaas et al. | 700/94 |
| 2004/0031856 | A1* | 2/2004 | Atsmon et al. | 235/492 |
| 2006/0267758 | A1* | 11/2006 | Barth et al. | 340/539.1 |
| 2008/0130048 | A1* | 6/2008 | Tsai | 358/1.15 |
| 2010/0067722 | A1* | 3/2010 | Bisgaard | 381/314 |

* cited by examiner

Primary Examiner — Thao P. Le
(74) Attorney, Agent, or Firm — Michael Chan

(57) ABSTRACT

A processing apparatus comprises a beeper system for controlling operation of a beeper in response to beeper control signals, an audio system for controlling operation of at least one speaker in response to audio data signals, and a redirection module for redirecting a beeper control signal to the audio system.

20 Claims, 4 Drawing Sheets

AUDIO PROCESSING APPARATUS

FIELD OF INVENTION

The present invention relates to the generation of sounds by a processing apparatus, in particular to the generation of sounds using the beep function of a PC or other computer.

BACKGROUND OF INVENTION

In certain aspects the invention relates to the generation of sounds using the beep function of a PC or other computer forming part of an automated teller machine (ATM) or other service apparatus that comprises a PC or other computer sealed or encased within an outer casing that restricts or muffles sounds produced by a beeper on the motherboard of the PC or other computer.

In known ATMs a PC or other computer motherboard is used as a control processor for controlling operation of the ATM and controlling communication and interaction with a user. Communication with a user is typically either by display of text on a display screen or by generation of audible signals.

The audible signals include beeps in response to keystrokes by a user, insertion or withdrawal of a card or other token, insertion or withdrawal of money, or an error.

The audible signals may also include recorded or computer-generated speech, which may be transmitted via loudspeakers or via an audio socket and user headphones. Such recorded or computer-generated speech may be used, for instance, to communicate with a user who has a visual impairment.

The beeps are most efficiently generated using the beep function of the PC or other computer, as application software can easily access and control the beep function via basic operating system commands. For instance, the Windows Win32 application program interface (API) has a Beep function that allows application software to issue a noise on the system beeper on the PC motherboard.

However, the motherboard inside known ATMs is encased in the PC core, which is encased in an outer ATM cabinet. Therefore the system beeper must be amplified if it is to be heard by a user. In known ATMs, special hardware is required to route the System Beeper signal to an amplifier and hence to speakers on the outer case of the ATM. Thus, whilst the use of the beeper signal is computationally efficient, in practice it requires the use of additional hardware if it is to be heard by a user.

Known ATMs also have additional audio functionality, supported on the motherboard, which is used to produce other types of audible signal. The output signal from the audio circuitry is routed to speakers at the front of the ATM. The output signal is amplified within the audio circuitry using standard Windows DirectX APIs.

FIG. 1 provides an overview of a known ATM 2, including various hardware components used in the generation and transmission of audio data signals. The ATM 2 includes a PC processor 4 mounted on a motherboard 6. The PC processor 4 controls operation of the ATM, including control of visual and audio communication with the user.

Other hardware components relating to the generation and control of beep signals are also mounted on the motherboard 6, including a beep generator 8 which is connected in turn to a beeper 10 and, in parallel, via a hard wired connection 11, to a beep signal amplifier 12. The beep signal amplifier 12 is connected to a beeper speaker 14 on the casing of the ATM.

Hardware components relating to the generation and control of other audio data signals are also mounted on the motherboard 6, including an audio chip 16 and amplification and speaker control circuitry 18. The amplification and speaker control circuitry 18 is connected to speakers 20 22. A private volume button 26, a public volume button 27, and a beeper volume control 28 are provided to enable control of volumes by a user.

The ATM includes a display screen 24 for displaying text to a user. The control circuitry for the display screen is not shown, for reasons of clarity.

FIG. 2 is a more detailed diagram of the audio generation and transmission system of the known ATM 2 of FIG. 1. Like reference numerals are used to refer to like components. FIG. 2 shows schematically various software modules and applications that run within the processor 4.

The processor 4 is delimited by the dashed line in FIG. 2. Examples of data flows and communication paths between the software components and modules, and between those software components and modules and the hardware components, are represented schematically by arrows.

The software components and modules run by the processor 4 of the prior art ATM 2 include various applications 30, linked to components relating to the generation of a beep, namely a Win 32 Beep API 34, in communication with a beep driver 36, which is in communication with the beep generator 8. The applications 30 are also linked to software components relating to the generation of other sounds, namely a DirectX module 42 for processing audio data signals such as generated or pre-recorded speech, and are also able to call on various multimedia APIs 44 to generate sound objects that can be used to generate other sounds. The DirectX module 42 is linked to an audio driver stack 46 which is linked in turn to the audio chip 16. The multimedia APIs 44 are operable to generate sound objects and to provide them to the audio driver stack 46. Finally, the applications are also linked to an enhanced audio control system which comprises a CEN XFS sensors and indicators unit (SIU) service provider 48 and a serial device communication driver 50 for the amplification and speaker control circuitry 18. The amplification and control circuitry 18 comprises an enhanced audio logic chip 52, a public amplification module 154 and a private amplification module 56.

In order to provide a more audible beep sound to a user, the prior art ATM 2 requires the addition of the hardwired connection 11 from the output of the beep generator 10, the beep signal amplifier 12, and the additional beeper speaker 14 on the casing of the ATM.

SUMMARY OF INVENTION

In a first, independent aspect of the invention there is provided a processing apparatus comprising a beeper system for controlling operation of a beeper in response to beeper control signals, an audio system for controlling operation of at least one speaker in response to audio data signals, and a redirection module for redirecting a beeper control signal to the audio system.

The audio system may be used to cause the at least one speaker to produce a sound in response to the redirected beeper control signal. Thus, a sound may be produced in response to a beeper control signal that may be more clearly audible to a user than the sound that the beeper system would produce in response to the beeper control signal. That may be particularly useful in the case where the beeper is located such that beeps produced by the beeper are muffled or restricted for a user.

Preferably the beeper control signal is intended for the beeper system. The redirection module may be located such as to intercept the beeper control signal before arrival at the beeper system.

The processing apparatus may comprise software or hardware, and may be made up of a mixture of software and hardware.

Similarly each of the beeper system and the audio system may comprise software or hardware, and each of the beeper system and the audio system may be made up of a mixture of software and hardware. The beeper system may comprise beeper circuitry. The audio system may comprise audio circuitry.

Each audio data signal preferably comprises data representative of a sound or sounds, and preferably the audio system is configured to cause the at least one speaker to generate the sound or sounds represented by the audio data signal upon processing the audio data signal. Each audio data signal may comprise, or be represented by, a .WAV file, or any other suitable audio or multimedia data format, such as MPEG, AVI or WMF.

The redirected beeper control signal preferably causes the audio system to control the at least one speaker to generate a sound.

Preferably the beeper control signal is representative of a beep sound, and preferably comprises at least one of a frequency parameter and a duration parameter. The beeper control signal may be the output from an API.

The beeper system may comprise at least one of a beeper driver, and a beep generator. The audio system may comprise at least one of an audio driver stack, an audio chip, an amplifier, and amplification control circuitry.

Preferably the processing apparatus further comprises a processing module for processing the redirected beeper control signal.

The apparatus may further comprise a processing module for converting the beeper control signal to an audio data signal. The audio data signal resulting from conversion of the beeper control signal may be referred to as the beep audio data signal.

Preferably the processing module is configured to pass the beep audio data signal to the audio system. The processing module may form part of the audio system. Alternatively the processing module or the combined redirection and processing module may be located between the redirection module and the audio system. In that case, the redirected beeper signal received by the audio system may be in the form of an audio data signal. Preferably the audio data signal is representative of a beep sound represented by the beeper control signal.

The beeper control signal may be representative of a beep sound and the processing module may be configured to convert the beeper control signal to the audio data signal by selecting at least one stored signal to represent the beep sound. The or each stored signal may comprise, or be stored as, a .WAV file, or in any other suitable audio or multimedia data format, such as MPEG, AVI or WMF. The processing module may be configured to select a stored signal from amongst a plurality of stored signals.

The processing module may be configured to specify at least one playback parameter for the selected at least one stored signal. The at least one playback parameter may comprise playback speed, and preferably the processing module is configured to select a playback speed in order to obtain a desired frequency of sound. The at least one playback parameter may comprise duration. Alternatively or additionally, the at least one playback parameter may comprise number of times for the at least one stored signal to be played, and preferably the processing module is configured to select a number of times for the at least one stored signal to be played in order to obtain a desired duration of sound. The number of times to be played may be a fractional number of times, and may be less than one if the desired duration of sound is less than the length of the sound represented by the stored signal.

The apparatus may further comprise a mixing module configured to combine the beep audio data signal with at least one other audio data signal to produce a combined audio data signal. Thus, a beep sound may be produced simultaneously with other sounds that the apparatus produces to communicate with a user, preferably using the same speaker or speakers.

The at least one other audio data signal may be representative of speech. The speech may be computer-generated or pre-recorded speech. Thus, the beep sound may be produced simultaneously with instructions or other speech communication to a user, preferably using the same speaker or speakers.

The mixing module preferably comprises a DirectX module. The mixing module preferably uses DirectX to combine the audio data signals. The mixing module and the processing module may be a single mixing and processing module.

The beeper system may comprise a beeper driver. Preferably the redirection module is arranged so as to intercept the beeper control signal intended for the beeper driver. Alternatively, the redirection module may be configured to read the beeper control signal from the beeper driver.

The redirection module may be located at the top of the beeper driver stack. The redirection module and the beeper driver may form part of a modified operating system kernel, preferably a modified Windows kernel.

The processing apparatus may further comprise an application interface, the application interface being configured to send the beeper control signal to the beeper system and to expect a response message from the beeper system, and the redirection module may be configured to send the expected response message to the application interface. Thus, normal operation of the application interface may be obtained, even though the beeper control signal is redirected to the audio system.

The application interface may be configured to wait for the expected response message and to block the sending of further beeper control messages until the expected response message has been received. The redirection module may be configured to generate the expected response message. The application interface may comprise a Windows beep API, preferably a Win32 Beep API.

The application interface may be configured to communicate with the beeper system according to an IOCTL procedure, and the response message may be an IOCTL response message. Preferably, the IOCTL response message is an IOCTL status code.

The processing module may be configured to send a request for service to the redirection module, and the redirection module is configured to respond to the request for service by redirecting a beeper control signal to the processing module upon receipt of the beeper control signal at the redirection module.

Preferably, in operation, at least some aspects of operation of the redirection module and/or the processing module are blocked pending the sending or receipt of a response. Preferably the redirection module is configured so that it cannot pass a beeper control signal to the beeper circuitry whilst a response to a request for service from the processing module is required. Thus, the possibility of the redirection module inadvertently passing a beeper control signal to the beeper circuitry in error may be avoided.

The processing module may be configured to send a further request for service immediately upon receipt of a response from the redirection module. Thus, the possibility of the redirection module omitting to redirect a beeper control signal may be avoided.

The processing module and the redirection module may be configured to communicate according to an input/output control (IOCTL) procedure, and the request for service may comprise an IOCTL message. The response to the request for service may comprise an IOCTL response message, preferably an IOCTL status code.

Preferably, the redirection module includes a redirection setting which determines whether, in operation, the redirection module redirects the beeper control signal to the audio system or not. Thus, a straightforward way of controlling operation of the redirection module may be provided. The redirection setting may determine whether the redirection module is operational or not.

That provides for a particularly straightforward method of manufacture and installation of the processing apparatus. The redirection functionality may or may not be required, depending on whether other devices or components are present. In the situation where, for instance, the need or otherwise for the redirection functionality is determined upon installation of the processing apparatus, the redirection setting can be used to enable or disable the redirection functionality at the installation stage.

The redirection module may be configured to determine whether at least one specified device or component is present or absent, and to set the value of the redirection setting in dependence upon whether the at least one specified device or component is present or absent.

Thus, the redirection module may be operable to enable or disable the redirection functionality automatically.

The presence or absence of the at least one specified device or component may be determined in dependence upon whether the at least one specified device or component is within the processing apparatus or connected to, or in communication with, the processing apparatus.

The redirection module may be configured to redirect the beeper control signal to the audio system and also to direct the beeper control signal to the beeper system in dependence upon the value of the redirection setting.

Preferably the redirection module is implemented in software. The redirection module may be implemented solely in software. Preferably the processing module is implemented in software. The processing module may be implemented solely in software.

The processing apparatus may form part of a user service apparatus, and preferably the user service apparatus is an automated teller machine (ATM). The user service apparatus may comprise an outer casing and a motherboard within the user service apparatus, and the processing apparatus and the beeper may be installed on the motherboard within the user service apparatus. The outer casing may comprise the at least one speaker and/or at least one aperture aligned with the at least one speaker.

The motherboard may be a PC motherboard or other computer motherboard. The processing apparatus may comprise or be a PC processor or other computer processor, preferably a CPU.

The processing apparatus may be configured to operate in accordance with a PC or other personal computer operating system, preferably Windows. The operating system is not limited to any particular version of an operating system, and in particular is not limited to any particular version of Windows.

In another, independent aspect there is provided a method of producing a beep sound, comprising redirecting a beeper control signal intended for a beeper system to an audio system, and using the audio system to control a speaker to produce the beep sound.

The method preferably further comprises converting the redirected beeper control signal to an audio data signal for processing by the audio system.

The beeper control signal is preferably representative of the beep sound, and the conversion of the beeper control signal to an audio data signal may comprise selecting at least one stored signal to represent the beep sound.

The beeper control signal may be received from an application interface, and the method preferably further comprises sending a response message to the application interface.

The redirecting may be performed by a redirection module and the conversion may be performed by a processing module, and the method preferably further comprises sending a request for service from the processing module to the redirection module, responding to the request for service by redirecting a beeper control signal to the processing module upon receipt of the beeper control signal at the redirection module.

The method may further comprise determining whether or not to redirect the beeper control message to the audio system in dependence upon the value of a redirection setting. Preferably the method further comprises setting the value of the redirection setting in dependence upon whether at least one specified device or component is present or absent.

References to a particular module or other component being configured to perform a process cover, but are not limited to, the module or component comprising a sub-module or sub-component for performing that process. Any plurality or combination of software components or modules described herein may be combined into a single software component or module.

Any feature in one aspect of the invention may be applied to other aspects of the invention, in any appropriate combination. In particular, apparatus features may be applied to method features and vice versa.

Embodiments of the invention will now be described, by way of example only, with reference to the accompanying drawings.

DETAILED DESCRIPTION

Figure 3:
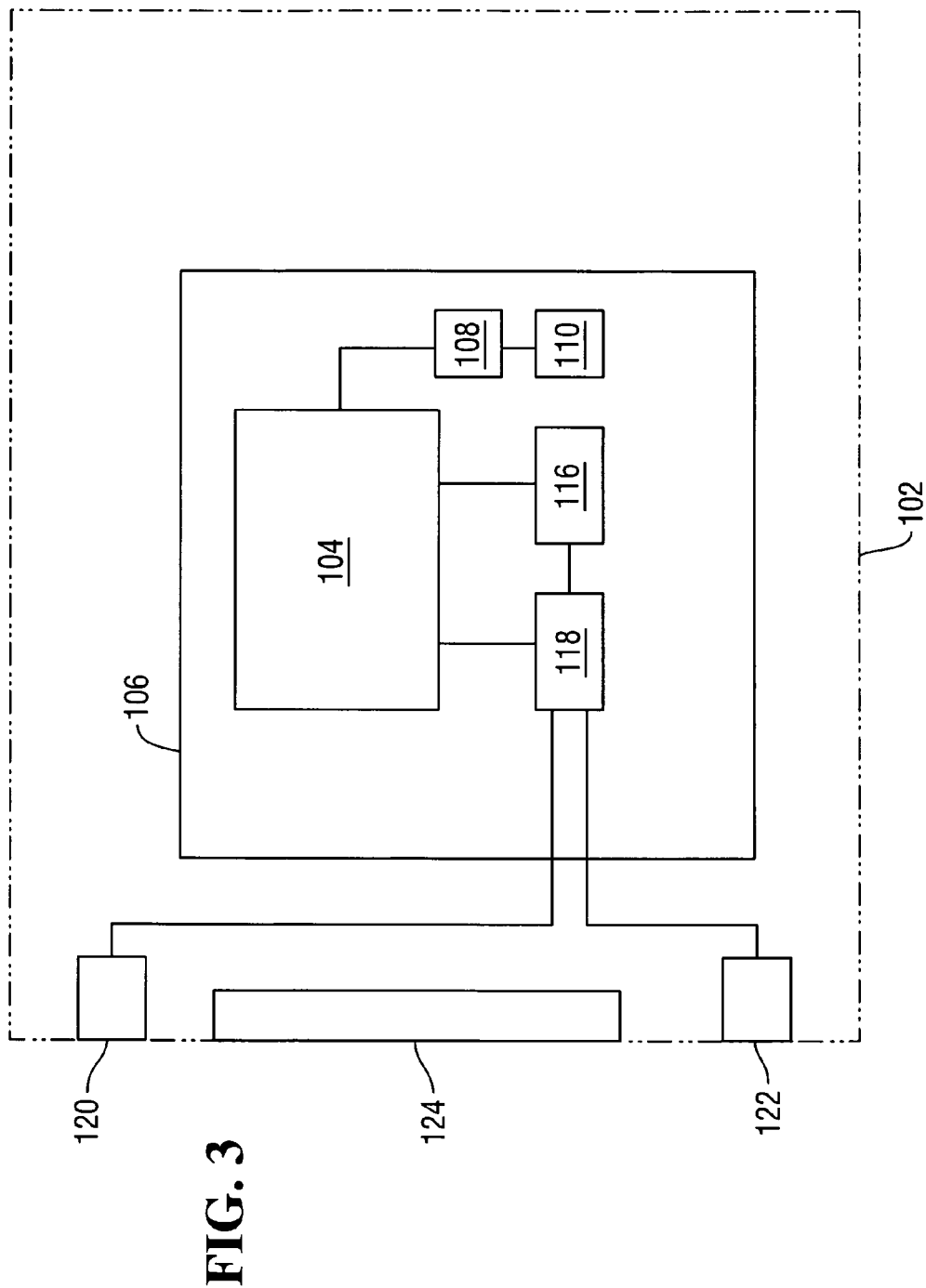
FIG. 3 is a schematic diagram showing, in overview, certain hardware components of an ATM according to the preferred embodiment.

FIG. 3 provides an overview of an ATM 102 according to the preferred embodiment, including various hardware components used in the generation and transmission of audio signals.

The ATM 102 includes a PC processor 104 mounted on a motherboard 106. The PC processor 104 controls operation of the ATM, including control of visual and audio communication with the user. Other hardware components relating to the generation and control of beep signals are also mounted on the motherboard 106, including a beep generator 108. Hardware components relating to the generation and control of other audio data signals are also mounted on the motherboard 106, including an audio chip 116 and amplification and speaker control circuitry 118. The amplification and speaker control circuitry 118 is connected to speakers 120 122.

The ATM includes a display screen 124 for displaying text to a user. The control circuitry for the display screen is not shown, for reasons of clarity.

Figure 1:
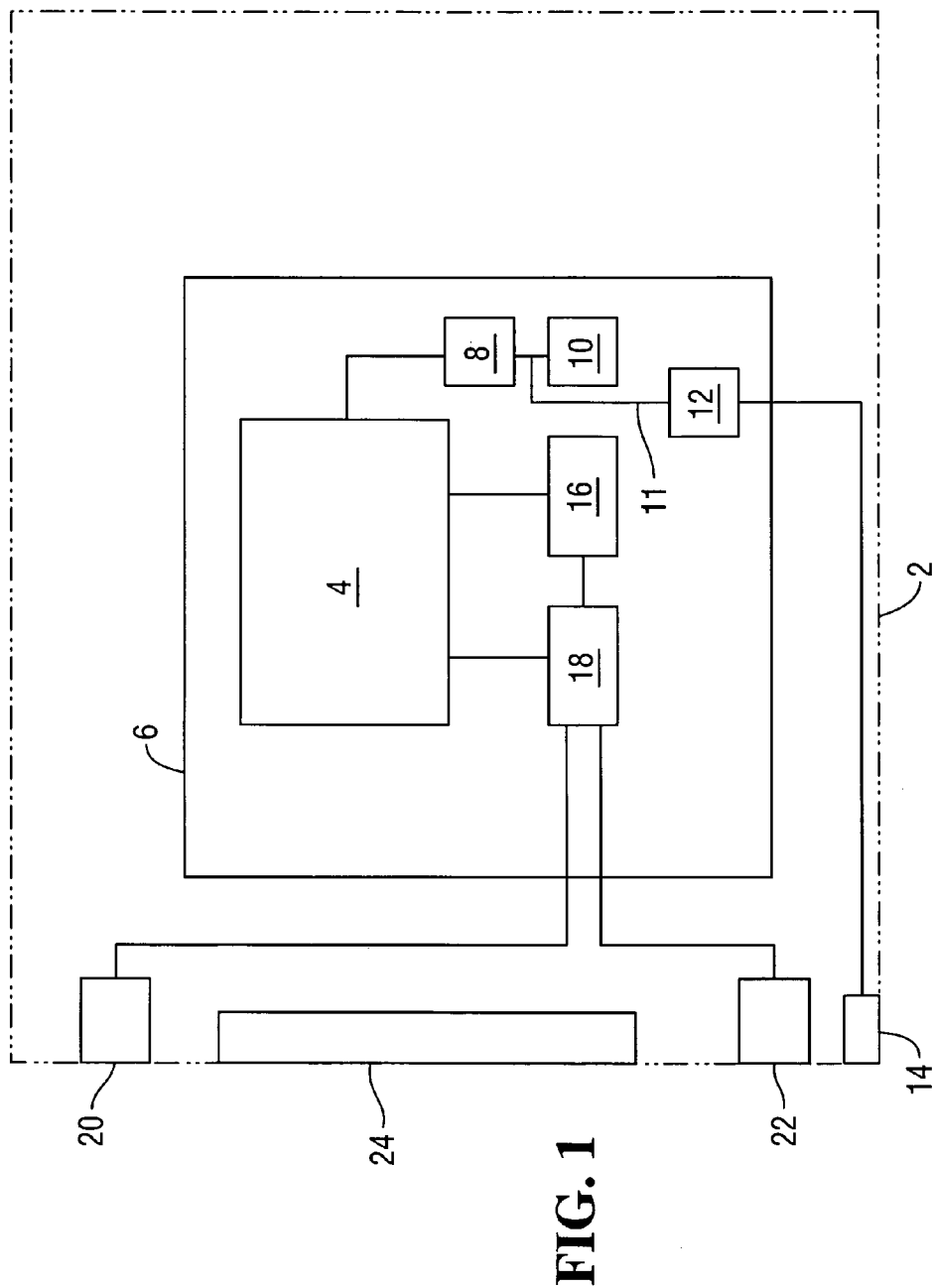
FIG. 1 is a schematic diagram showing, in overview, certain hardware components of a known ATM.

It can be seen from comparison of FIGS. 1 and 3, that the ATM 102 of the preferred embodiment has hardware features in common with the known ATM 2. However, significant differences include but are not limited to the differences that the ATM 102 of the preferred embodiment does not include a beeper amplifier, a separate beeper speaker, or an additional hardwired link leading off the output of the beep generator 110. It is a feature of ATM 102 of the preferred embodiment that a beep can be made clearly audible to a user without the need for additional hardware, such as the beeper amplifier and separate beeper speaker, as will be described in more detail below.

Figure 4:
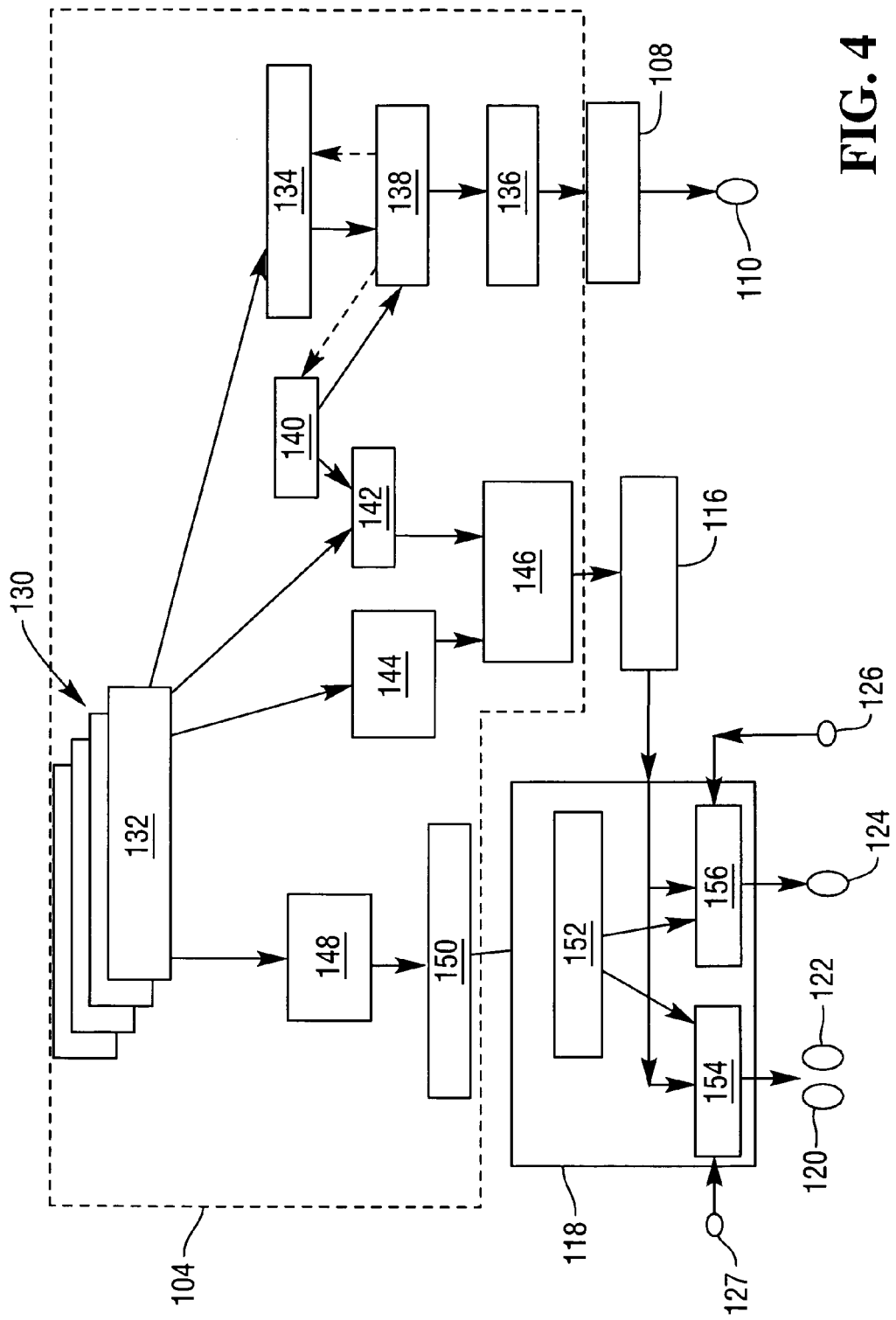
FIG. 4 is a schematic diagram of the audio generation and transmission system of the ATM of the preferred embodiment, including various software modules and applications.

FIG. 4 is a more detailed diagram of the audio generation and transmission system of the ATM 102 of the preferred embodiment.

Some additional hardware components are shown in FIG. 4, which were omitted from FIG. 3 for reasons of clarity. Those additional components are an audio jack 124, a private volume button 126, and a public volume button 127. A user may plug headphones into the audio jack if they wish to listen to sound from the ATM 102 via the headphones rather than via the speakers 120 122.

The processor 104 is delimited by the dashed line in FIG. 4. Various software components and modules that run on the processor 104 in operation are shown. Examples of data flows and communication paths between the software components and modules, and between those software components and modules and the hardware components, are represented schematically by arrows.

The processor 104 is able to run any one of a range of different applications 130, any of which may require the generation or playback of sounds or beeps.

An application 132 included in the range of applications 130 is able to request a beep by sending a beeper control signal via the Win 32 Beep API 134. The beeper control signal specifies the frequency and duration of the beep, in Hz and ms.

The beeper control signal is sent by the Win 32 Beep API 134 towards a beep driver, in this case a Microsoft beep driver 136.

Figure 2:
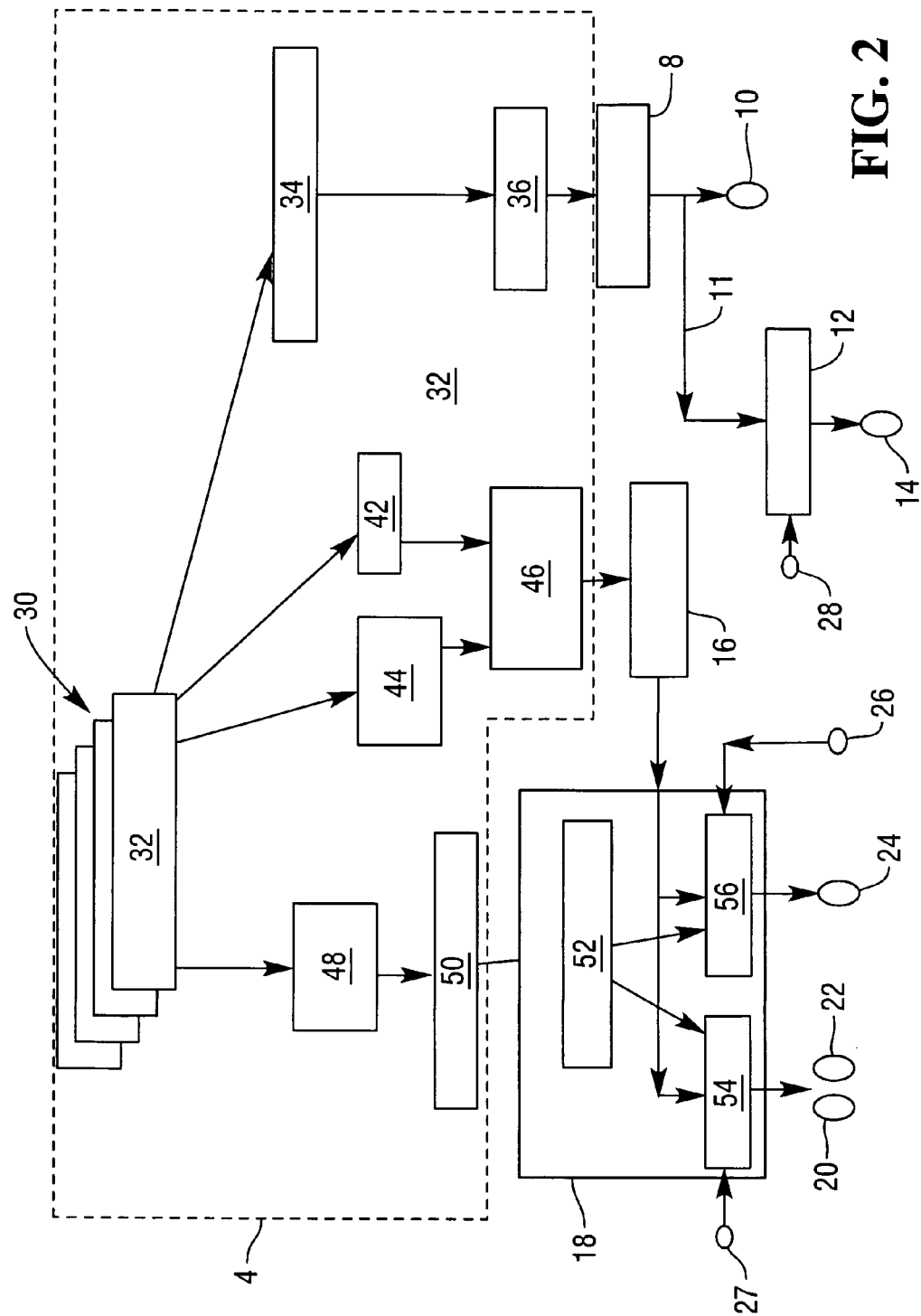
FIG. 2 is a schematic diagram of the audio generation and transmission system of the known ATM of FIG. 1, including various software modules and applications.

In a known system such as that of FIGS. 1 and 2, or in any standard PC, the beeper control signal would be received by the beep driver passed on to hardware beep generator, such as the hardware beep generator 108 shown in FIG. 4, which would cause the beeper 110 to produce a beep.

In contrast to such known systems, a redirection module is located between the Win 32 Beep API 134 and the beep driver 136. In the preferred embodiment the redirection module is in the form of a kernel filter driver, referred to as the beep filter driver 138. The beep filter driver 138 attaches to, and sits above, the Windows supplied beep driver 136 in the Windows kernel. The beep filter driver 138 is also connected an audio converter application 140, which is connected in turn to a DirectX module 142. The beep filter driver 138 comprises a further beep device and a beep filter device.

The application 132 is also able to communicate with the DirectX module 142, and to send audio data signals directly to the DirectX module 142. The audio data signals are, for example, .WAV files. In operation, the DirectX module is able to mix audio data signals received from the audio converter application 140 and received directly from the application 132.

The application 132 is also able to call on other multimedia APIs 144 to generate sound objects. Such other sound objects may be standard, system provided sound objects. Such other sound objects from the APIs 144 are passed to an audio driver stack 146. The DirectX module 142 is also connected to the audio driver stack 146 and passes audio data signals to the audio driver stack 146 in operation.

The audio driver stack 146 is connected to the audio chip 116, which in turn is connected to the amplification and speaker control circuitry 118. In operation audio data signals are processed by the audio chip 116 to be in the appropriate form for passing to the amplification and speaker control circuitry 118. The signals are passed to the amplification and speaker control circuitry 118, which causes the speakers to generate sounds represented by the audio data signals and which controls the volume, and other characteristics such as sound quality and balance, of the sound produced by the speakers.

The application 132 is able to control volume and other characteristics via an enhanced audio control system which comprises the amplification and speaker control circuitry 118, an audio control module 148 and a driver 150. In the preferred embodiment, the audio control module is in the form of a CEN XFS SIU service provider, and the driver 150 is a universal miscellaneous interface module driver.

The application 132 is connected to the audio control module 148, which is connected in turn to the driver 150. The driver 150 is connected to the amplification and speaker control circuitry 118 via USB connections, and drives operation of the amplification and speaker control circuitry 118.

The amplification and speaker control circuitry 118 comprises an enhanced audio logic chip 152, a public amplification module 154 and a private amplification module 156. The amplification and speaker control circuitry 118 is connected to and interfaces with the speakers 120 122 and the audio jack 124 via standard audio cabling. The public amplification module is operable to control the volume of sound produced by the speakers 120 122, and the private amplification module 156 is operable to control the sound produced by headphones connected to the audio jack 124.

To control the volume and other characteristics of the sound produced by the speakers 120 122 or headphones the application 132 sends audio control signals to the amplification and speaker control circuitry 118 via the audio control module 148 and a driver 150. The application 132 is also able to control the relative volume of any beeps by sending a beep volume command to the audio control module 148. The audio control module 148 forwards the beep volume command to the beep filter driver 138, which in turn forwards it to the audio converter application 140 and then to the DirectX module 142. The DirectX module then sets the relative volume parameter of an audio data signal representative of a beep compared to audio data signals representative of other sounds.

Operation of the preferred embodiment, and in particular the use of the beep function and production of beep sounds, is now considered in more detail.

The application 132 issues a beep instruction via the Win32 Beep API call, which passes a beeper control signal towards the beep driver 136. The beeper control signal comprises frequency and duration parameters determining the frequency (in Hz) and duration (in ms) of the beep sound that is required.

When sending a beep request the Win32 Beep API call communicates the request, in the form of the beeper control signal, to the top of the device stack of the Beep driver 136. In the preferred embodiment the filter driver 138, acting as a redirection module, lies at the top of the device stack. Therefore the beeper control signal from the Win32 Beep API call is effectively intercepted by the filter driver 138, which receives the beep requests. The beeper control signal is received by the further beep device included in the filter driver 138 and passed to the beep filter device, also included in the filter driver 138.

The beeper control signal is sent with an IOCTL message in accordance with the IOCTL protocol, and operation of the Win32 Beep API is blocked until it receives a response to the IOCTL message. The filter driver 138 is configured to respond to the IOCTL message, in place of the beep driver 136, by sending a status code back to the Win32 Beep API acknowledging receipt of the IOCTL message. Operation of the Win32 Beep API is unblocked upon receipt of the status code from the filter driver 138.

The filter driver 138 also supports an interface on the audio converter application 140.

One of the functions of the audio converter application 140 is to block an IO control block (IOCTL) waiting on a system beep to occur, by sending an IOCTL message to the filter driver 138. Operation of the filter driver 138 is blocked until the IOCTL message is cleared.

When the filter driver 138 intercepts a beep request, in the form of a beeper control signal, it releases the blocked IOCTL by sending a status code message, which includes the parameters required for the Beep (frequency and duration), from the beep filter device including in the filter driver 138 to the audio converter application 140.

The audio converter application 140 then uses an algorithm to convert the beep parameters into an audio data signal. The audio converter application uses a selected one of three stored fixed WAV files (recorded at a fixed sampling rate) to represent the beep. The algorithm selects one of the WAV files to represent the beep. The algorithm calculate a playback sampling rate for the selected WAV file based on the frequency required for the beep and the recorded sample rate and frequency of the static WAV file. The algorithm also selects how many times the WAV file needs to be replayed, or at what point the WAV file needs to be stopped, to produce a beep of the required duration. The audio converter then outputs an audio data signal representative of the beep using the WAV files and passes the audio data signal from the audio converter application 140 to the DirectX module 142.

The DirectX module 142 may also receive directly from the application 132 audio data signals representative of other sounds to be played, if any, for instance generated or pre-recorded speech. The DirectX module 142 mixes the audio data signal representative of the beep with any such other audio data signals and produces, if necessary, a combined audio data signal representative of the mixture of sounds and beep. Thus, the use of DirectX allows the beep sound to be mixed with any other sounds that may be currently playing (such as audio instructions to a user).

The volume to be used for the redirected beep can be configured on individual ATMs through adjustments made in configuring the audio system. The volume can also be controlled via the beep volume control signal sent from the application via the audio control module 148, the beep filter driver 138, and the audio converter application 140, to the DirectX module 142. The DirectX module 142 alters the relative amplitude of the input beep audio data signal component compared to the other input audio data signal components in dependence on the beep volume control signal.

The resulting audio data signal is then passed via the audio driver stack 146, the audio chip 116, the amplification and speaker control circuitry 118, which process the signal appropriately, to the speakers and/or the audio jack. Sounds represented by the audio data signal are produced by the speakers 120 122 and/or headphones plugged into the audio jack 124.

In another mode of operation, the filter driver 138 may also be operable to pass the beeper control signal on to the beeper driver 136 as well as redirecting it to the audio converter application 140. According to that mode of operation, after releasing the blocked IOCTL at the beep filter device, the filter driver 138 decides what to action to perform on the motherboard beeper 110 based on a configuration setting:— no beep or beep. If the configuration setting is beep, the beeper control signal is passed to the beeper driver 136, which then drives operation of the beep generator 108 and, in turn, the beeper 110 to produce a beep sound. Thus, according to that mode of operation, a beep sound is produced both by the beeper 110 and by the loudspeakers 120 122 and/or headphones plugged into the audio jack 124, in response to the same beeper control signal.

In a variant of the preferred embodiment, an additional link is provided from the output of the beep generator 108 to the audio chip 116, and a beep signal can be passed from the output of the beep generator and processed by the audio chip to generate a beep sound at the loudspeakers 70 72. Thus, there is provided another way of generating a beep sound using the audio circuitry as well as or instead of using the beeper 60.

Operation of the redirection module and/or the processing module may be switched on or off, depending on the configuration of the rest of the system. In particular, in the preferred embodiment, the redirection functionality of the filter driver 138 can be switched off based on a configuration setting. Operation of the redirection module and/or the processing module can be determined by the configuration of some other aspects of the ATM, for instance the presence or absence of certain other hardware, or motherboard type. Therefore, the system for redirection and or conversion of beeper control signals (comprising the redirection module and processing module) can be loaded on all ATMs, and can be configured later, depending on whether beeper signal redirection is required, thus simplifying the production process. In one mode of operation, the redirection module and/or processing module detect the presence of absence of the other hardware themselves and set the configuration setting automatically. In another mode of operation the configuration setting is set by an operator during installation or maintenance.

As described above, there are provided software modules that enable the redirection of a beeper control signal to audio circuitry and the production of a beep sound at loudspeakers connected to that audio circuitry, thus providing for a beep that is clearly audible to a user. Also, the audio data signal or signals representing a beep or beeps may be mixed with other audio data signals to produce a combined audio data signal that can then be processed by the audio circuitry, providing a particularly efficient use of the audio circuitry and loudspeakers. The sound can be tuned using similar configuration techniques as used for general audio. The relative volume of the beep sound can be controlled using the software modules.

In contrast to the prior art systems, significant hardware modifications, for instance the provision of additional amplification hardware, such as an additional amplifier, an additional beeper speaker and a hardwired link to the additional amplifier and beeper speaker, are not required. The system is therefore simplified, requires fewer hardware components and is easier to build.

In the preferred embodiment, the redirection module is the filter driver 138 and the processing module is the audio converter application 140. In other embodiments, each of the redirection module and processing module may be implemented as any suitable module or sub-module, for instance any suitable software device, driver, application or sub-application, and may form part of a modified operating system or kernel. The redirection module and processing module may be combined to form a single redirection and processing module, and both or each may be combined with other software components or modules.

It will be understood that the present invention has been described above purely by way of example, and modifications of detail can be made within the scope of the invention. Furthermore, software features may be implemented as hardware and vice versa. Any combination of software components or modules described herein may be combined into a single software component or module.

Each feature disclosed in the description, and (where appropriate) the claims and drawings may be provided independently or in any appropriate combination.

What is claimed is:

1. An audio processing apparatus comprising:
   a first audio output device in the form of an audio beeper;
   a second audio output device which is separate and different from the first audio output device and which second audio output device is in the form of an audio speaker;
   a first audio control system including a beep generator and circuitry for controlling operation of the beep generator to provide a beep sound on the audio beeper in response to beeper control signals;
   a second audio control system including a speech generator or recorder and circuitry for controlling operation of the audio speaker in response to audio data signals from the speech generator or recorder; and
   a redirection module for redirecting a beeper control signal intended for the first audio control system to the second audio control system so that circuitry of the second audio control system can process the beeper control signal to provide a beep sound on the audio speaker.

2. Apparatus according to claim 1, further comprising a processing module for converting the beeper control signal to an audio data signal.

3. Apparatus according to claim 2, wherein the beeper control signal is representative of a beep sound and the processing module is configured to convert the beeper control signal to the audio data signal by selecting at least one stored signal to represent the beep sound.

4. Apparatus according to claim 1, further comprising a mixing module configured to combine the beep audio data signal with at least one other audio data signal to produce a combined audio data signal.

5. Apparatus according to claim 4, wherein the at least one other audio data signal is representative of speech from the speech generator or recorder.

6. Apparatus according to claim 1, further comprising an application interface, the application interface being configured to send the beeper control signal to the first audio control system and to expect a response message from the first audio control system, and the redirection module is configured to send the expected response message to the application interface.

7. Apparatus according to claim 2, wherein the processing module is configured to send a request for service to the redirection module, and the redirection module is configured to respond to the request for service by redirecting a beeper control signal to the processing module upon receipt of the beeper control signal at the redirection module.

8. Apparatus according to claim 7, wherein the processing module is configured to send a further request for service immediately upon receipt of a response from the redirection module.

9. Apparatus according to claim 1, wherein the redirection module includes a redirection setting which determines whether, in operation, the redirection module redirects the beeper control signal to the second audio control system or not.

10. Apparatus according to claim 9, wherein the redirection module is configured to determine whether at least one specified device or component is present or absent, and to set the value of the redirection setting in dependence upon whether the at least one specified device or component is present or absent.

11. Apparatus according to claim 1, wherein the redirection module is implemented in software.

12. An automated teller machine (ATM) comprising:
    an audio beeper;
    an audio speaker disposed on front of the ATM and for delivering speech and beep sounds to an ATM customer at the ATM;
    a first audio control system disposed within the ATM and including a beep generator and circuitry for controlling operation of the beep generator to provide a beep sound on the audio beeper;
    a second audio control system disposed within the ATM and including a speech generator or recorder and circuitry for controlling operation of the audio speaker on front of the ATM in response to audio data signals from the speech generator or recorder; and
    a redirection module disposed within the ATM and for redirecting a beeper control signal intended for the first audio control system to the second audio control system so that circuitry of the second audio control system can process the beeper control signal to provide a beep sound on the audio speaker on front of the ATM while an ATM customer is conducting an ATM transaction at the ATM.

13. An ATM according to claim 12, further comprising:
    a processing module for converting the beeper control signal to an audio data signal, wherein the beeper control signal is representative of a beep sound and the processing module is configured to convert the beeper control signal to the audio data signal by selecting at least one stored signal to represent the beep sound; and
    a mixing module configured to combine the beep audio data signal with at least one other audio data signal which is representative of speech from the speech generator or recorder to produce a combined audio data signal which is representative of a mixture of speech and a beep sound.

14. A method of producing a beep sound on an audio speaker located on front of an automated teller machine (ATM) which has (i) a beep generator without any separate beeper speaker off of the output of the beep generator, (ii) first circuitry for controlling operation of the beep generator to provide a beep sound, (iii) a speech generator or recorder, and (iv) second circuitry separate and different from the first circuitry and which second circuitry is provided for controlling operation of the audio speaker in response to audio data signals from the speech generator or recorder, the method comprising:

redirecting a beeper control signal intended for the first circuitry to the second circuitry so that the second circuitry can process the beeper control signal to produce a beep sound on the audio speaker on front of the ATM while an ATM customer is conducting an ATM transaction at the ATM.

15. A method according to claim 14, further comprising converting the redirected beeper control signal to an audio data signal for processing by the second circuitry.

16. A method according to claim 15, wherein the beeper control signal is representative of the beep sound, and the conversion of the beeper control signal to an audio data signal comprises selecting at least one stored signal to represent the beep sound.

17. A method according to claim 14, wherein the beeper control signal is received from an application interface, and the method further comprises sending a response message to the application interface.

18. A method according to claim 15, wherein the redirecting is performed by a redirection module and the conversion is performed by a processing module, and the method further comprises sending a request for service from the processing module to the redirection module, responding to the request for service by redirecting a beeper control signal to the processing module upon receipt of the beeper control signal at the redirection module.

19. A method according to claim 14, further comprising determining whether or not to redirect the beeper control signal to the second circuitry in dependence upon the value of a redirection setting.

20. A method according to claim 19, further comprising setting the value of the redirection setting in dependence upon whether at least one specified device or component is present or absent.

\* \* \* \* \*